(12) United States Patent
Hu et al.

(10) Patent No.: US 8,964,363 B2
(45) Date of Patent: Feb. 24, 2015

(54) HOLDING APPARATUS AND EXTERNAL KEYBOARD USING THE SAME

(71) Applicants: Hong Fu Jin Precision Industry (ShenZhen) Co., Ltd., Shenzhen (CN); Hon Hai Precision Industry Co., Ltd., New Taipei (TW)

(72) Inventors: Yong-Hui Hu, Shenzhen (CN); Qing-Qing Zheng, Shenzhen (CN); Shuang-Hong Xiao, Shenzhen (CN); Mei Zhou, Shenzhen (CN); Ke-Xin Tang, Shenzhen (CN); Kun-Chih Hsieh, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/059,462

(22) Filed: Oct. 22, 2013

(65) Prior Publication Data
US 2014/0111923 A1 Apr. 24, 2014

(30) Foreign Application Priority Data
Oct. 24, 2012 (CN) .......................... 2012 1 0409600

(51) Int. Cl.
*H05K 5/00* (2006.01)
*H05K 7/00* (2006.01)
*G06F 1/16* (2006.01)
*E05D 7/00* (2006.01)
*G06F 3/02* (2006.01)

(52) U.S. Cl.
CPC ................ *G06F 1/1633* (2013.01); *G06F 1/16* (2013.01); *G06F 3/02* (2013.01)

USPC ......................................... 361/679.02; 16/221

(58) Field of Classification Search
CPC ... G06F 1/1616; G06F 1/1656; G06F 1/1632; G06F 1/1626; G06F 1/181; G06F 1/187; G06F 1/184; G06F 3/0202; G06F 1/662; Y02E 60/12
See application file for complete search history.

(56) References Cited

U.S. PATENT DOCUMENTS

| | | | | |
|---|---|---|---|---|
| 4,976,559 | A * | 12/1990 | Inagaki | 400/691 |
| 5,899,421 | A * | 5/1999 | Silverman | 248/175 |
| 6,266,234 | B1 * | 7/2001 | Leman | 361/679.11 |
| 6,937,468 | B2 * | 8/2005 | Lin et al. | 361/679.41 |
| 6,944,014 | B2 * | 9/2005 | Chen et al. | 361/679.08 |
| 6,980,420 | B2 * | 12/2005 | Maskatia et al. | 361/679.57 |

(Continued)

*Primary Examiner* — Hoa C Nguyen
*Assistant Examiner* — Xanthia C Cunningham
(74) *Attorney, Agent, or Firm* — Novak Druce Connolly Bove + Quigg LLP

(57) ABSTRACT

A holding apparatus includes a base, a clamp portion protruding from the base, a fixed clamper, and a rotatable damper. The rotatable clamper includes a fixed arm and two resisting arms extending from the fixed arm toward the fixed damper. An adjustment portion includes an angle adjusting member and a locking member. The angle adjusting member includes a base body, a depressible member protruding from the base body, two side arms protruding from opposite ends of the base body, and two resisting portions protruding from the side arms. The two resisting portions resist on the two second resisting arms. The angle adjusting member includes a hook extending from a second bottom of the base body. The locking member includes a main body and at least one locking protrusion protruding from the main body. Each locking protrusion is engagable with the hook to prevent the rotatable clamper from rotating.

17 Claims, 13 Drawing Sheets

(56) References Cited

U.S. PATENT DOCUMENTS

| | | | |
|---|---|---|---|
| 7,439,436 B2* | 10/2008 | Sakurai | 84/423 R |
| 7,440,267 B2* | 10/2008 | Tatsukami et al. | 361/679.55 |
| 7,643,278 B2* | 1/2010 | Hou | 361/679.17 |
| 8,023,254 B2* | 9/2011 | Zhou | 361/679.17 |
| 8,284,543 B2* | 10/2012 | Wang | 361/679.01 |
| 8,599,542 B1* | 12/2013 | Healey et al. | 361/679.17 |
| 8,773,850 B2* | 7/2014 | Minaguchi et al. | 361/679.44 |
| 2003/0021082 A1* | 1/2003 | Lu et al. | 361/683 |
| 2004/0160738 A1* | 8/2004 | Chen et al. | 361/683 |
| 2006/0028791 A1* | 2/2006 | Huang et al. | 361/683 |
| 2006/0098397 A1* | 5/2006 | Chou | 361/680 |
| 2006/0152898 A1* | 7/2006 | Hirayama | 361/683 |
| 2006/0256511 A1* | 11/2006 | Ma | 361/680 |
| 2009/0231793 A1* | 9/2009 | Chiu et al. | 361/679.08 |
| 2010/0033914 A1* | 2/2010 | Liang et al. | 361/679.08 |
| 2010/0073857 A1* | 3/2010 | Lin et al. | 361/679.27 |
| 2010/0270453 A1* | 10/2010 | Chiang | 248/371 |
| 2011/0103003 A1* | 5/2011 | Ward et al. | 361/679.41 |
| 2011/0194268 A1* | 8/2011 | Kim et al. | 361/807 |
| 2012/0212900 A1* | 8/2012 | Hung | 361/679.41 |
| 2013/0083257 A1* | 4/2013 | Murakami et al. | 348/839 |
| 2013/0155583 A1* | 6/2013 | Yang et al. | 361/679.01 |
| 2014/0002974 A1* | 1/2014 | Kuo et al. | 361/679.01 |

* cited by examiner

HOLDING APPARATUS AND EXTERNAL KEYBOARD USING THE SAME

BACKGROUND

1. Technical Field

The present disclosure relates to external keyboards, and particularly to an external keyboard clamped to a tablet personal computer by a holding apparatus.

2. Description of Related Art

Keyboards are detachably clamped to tablet personal computers by clamping devices to provide external input interfaces for users. However, the keyboard is fixed to the tablet personal computer at only one predetermined angle, which may be uncomfortable for a user under certain conditions.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure including the accompanying drawings, is illustrated by way of example and not by way of limitation. It should be noted that references to "an" or "one" embodiment in this disclosure are not necessarily to the same embodiment, and such references mean "at least one."

Figure 1:
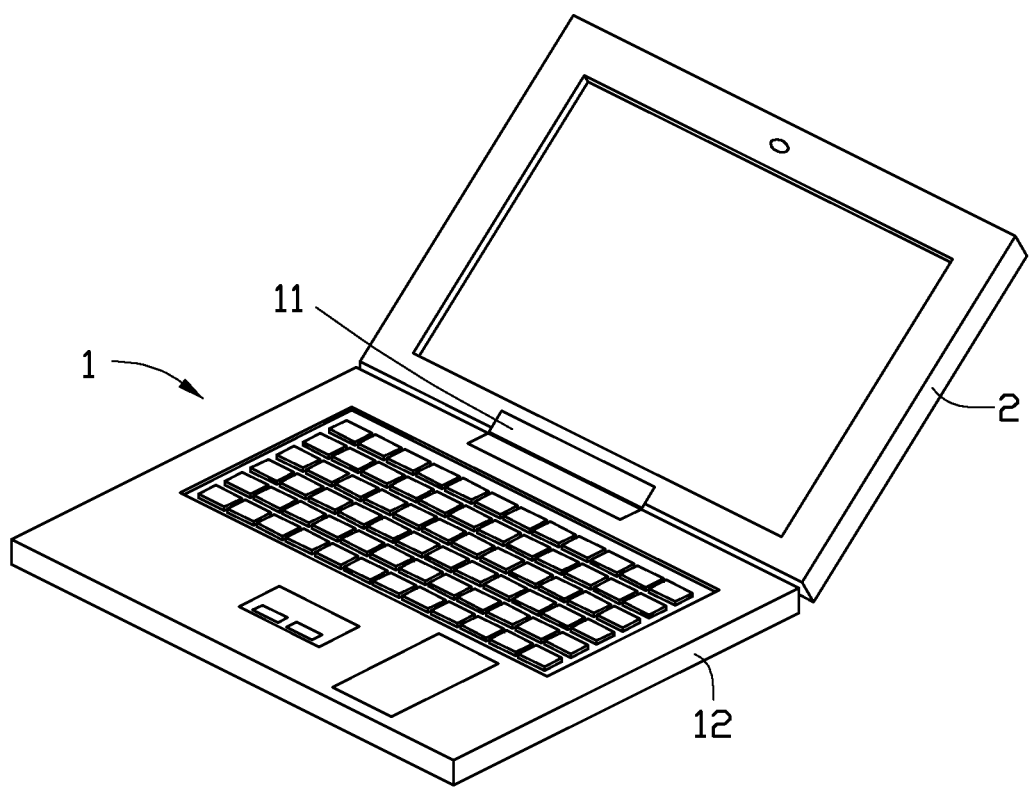
FIG. 1 is a schematic view of an external keyboard installed to a tablet personal computer via a holding apparatus.

FIG. 1 shows an external keyboard 1 of the disclosure. The external keyboard 1 includes a holding apparatus 11 and a keyboard body 12. The holding apparatus 11 is fixed to the keyboard body 12 and is used for clamping the keyboard body to an electronic device 2 to form an electronic device shaped like a notebook computer. In this embodiment, the electronic device 2 is a tablet personal computer. In other embodiments, the electronic device 2 is a flat panel display, a mobile communication device, an e-Reader, or other electronic device having a display screen.

Figure 2:
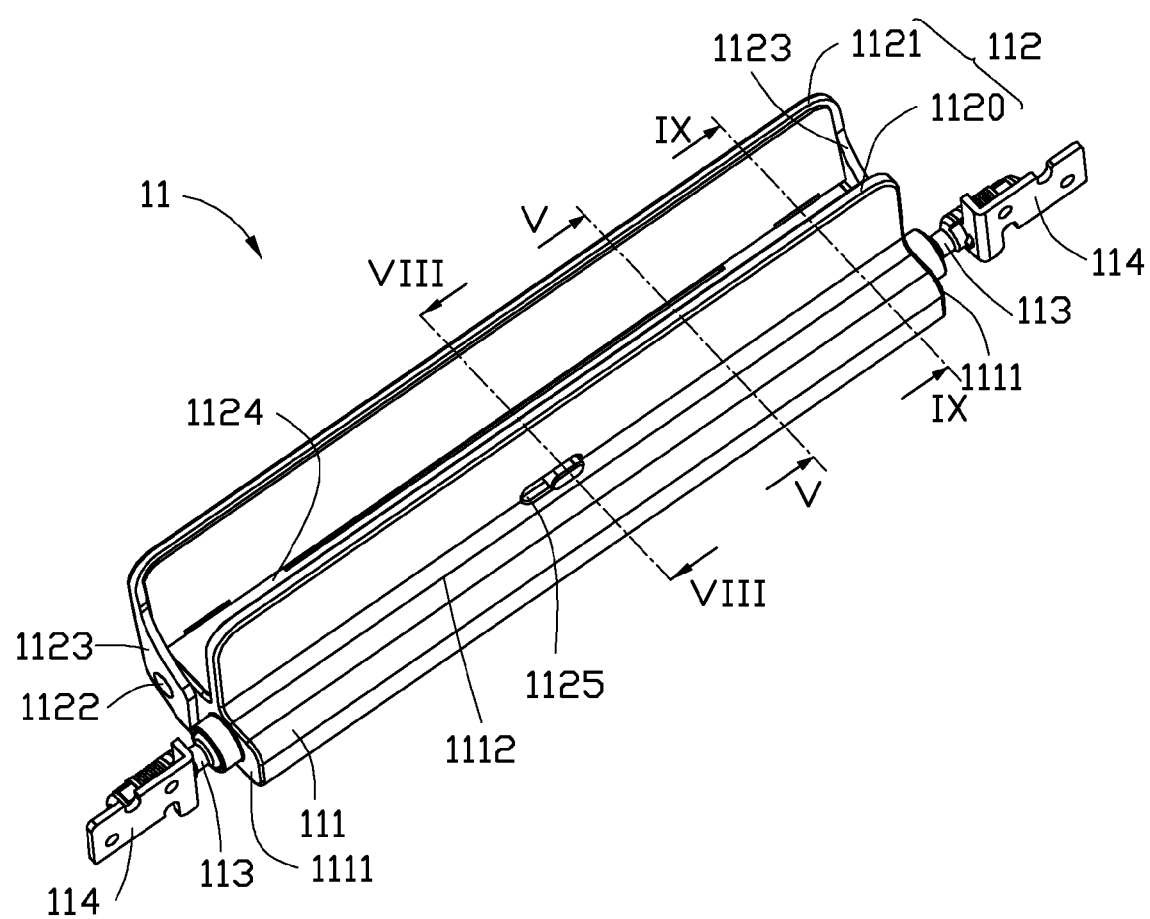
FIG. 2 is a schematic view of the holding apparatus of the external keyboard of FIG. 1.
Figure 3:
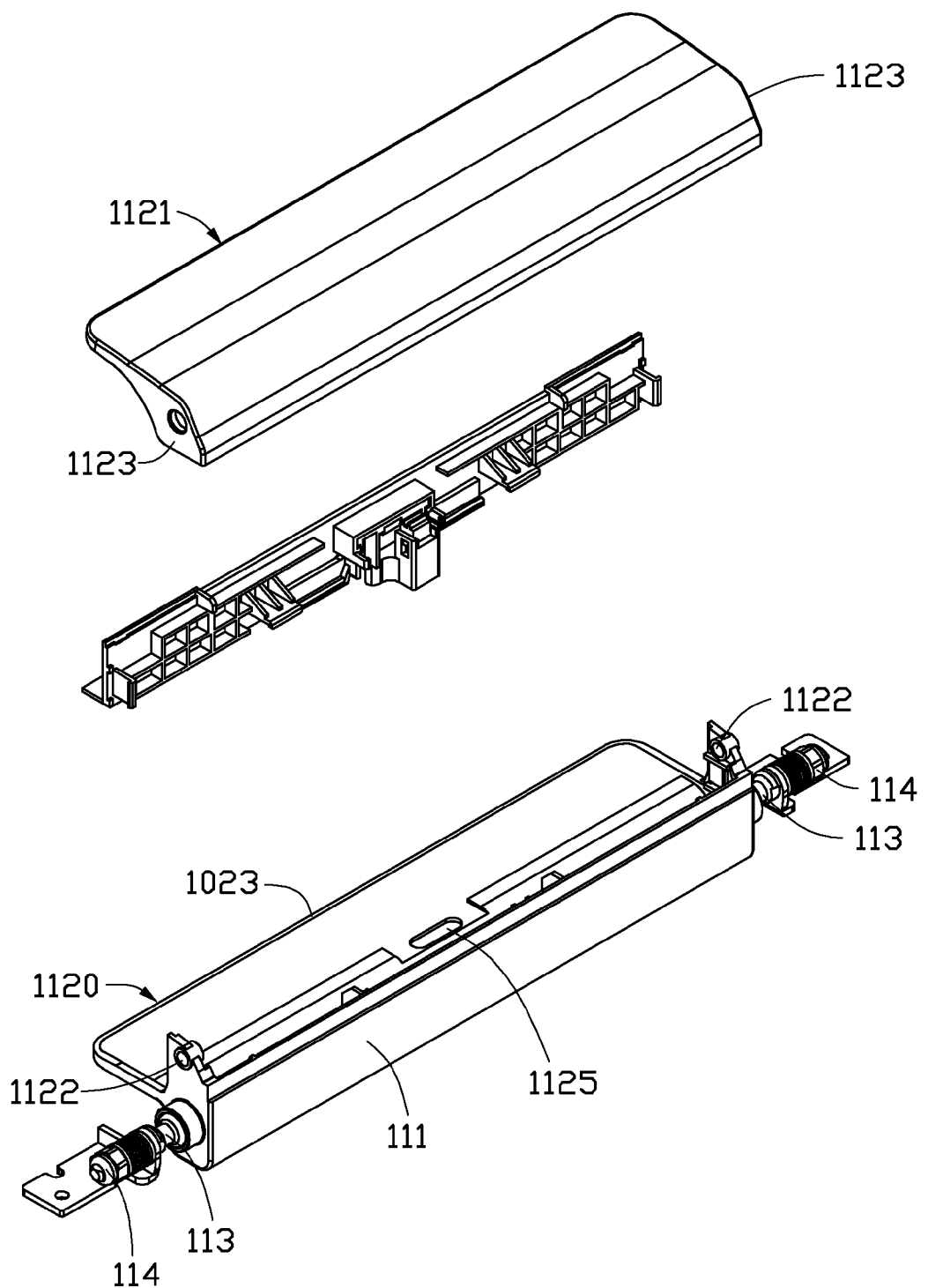
FIG. 3 is an exploded view of the holding apparatus of FIG. 2.

Referring to FIGS. 1, 2 and 3, the holding apparatus 11 includes a base 111, a clamp portion 112, two rotatable shafts 113, and two fixed portions 114. The two rotatable shafts 113 are rotatably connected to two opposite ends 1111 of the base 111 respectively. The two fixed portions 114 are fixed to the two rotatable shafts 113, respectively, at ends of the two rotatable shafts 113 away from the base 111. The keyboard body 12 is fixed to ends of the two fixed portions 114 away from the rotatable shafts 113. The keyboard body 12 is fixed to the holding apparatus 11 by the two rotatable shafts 113 and the two fixed portions 114, thereby allowing the holding apparatus 11 to rotate the keyboard body 12 at various predetermined angles.

The clamp portion 112 protrudes from a first upper surface 1112 of the base 111. The clamp portion 112 includes a fixed clamper 1120 and a rotatable clamper 1121. The fixed clamper 1120 and the base 111 are integrally formed, and the rotatable clamper 1121 is hinged to the base 111 through two pivots 1122 located at two opposite ends 1123 of the base 111, respectively. The fixed damper 1120, the base 111, and the rotatable clamper 1121 cooperatively define a holding groove 1124 for holding the electronic device 2.

Figure 4:
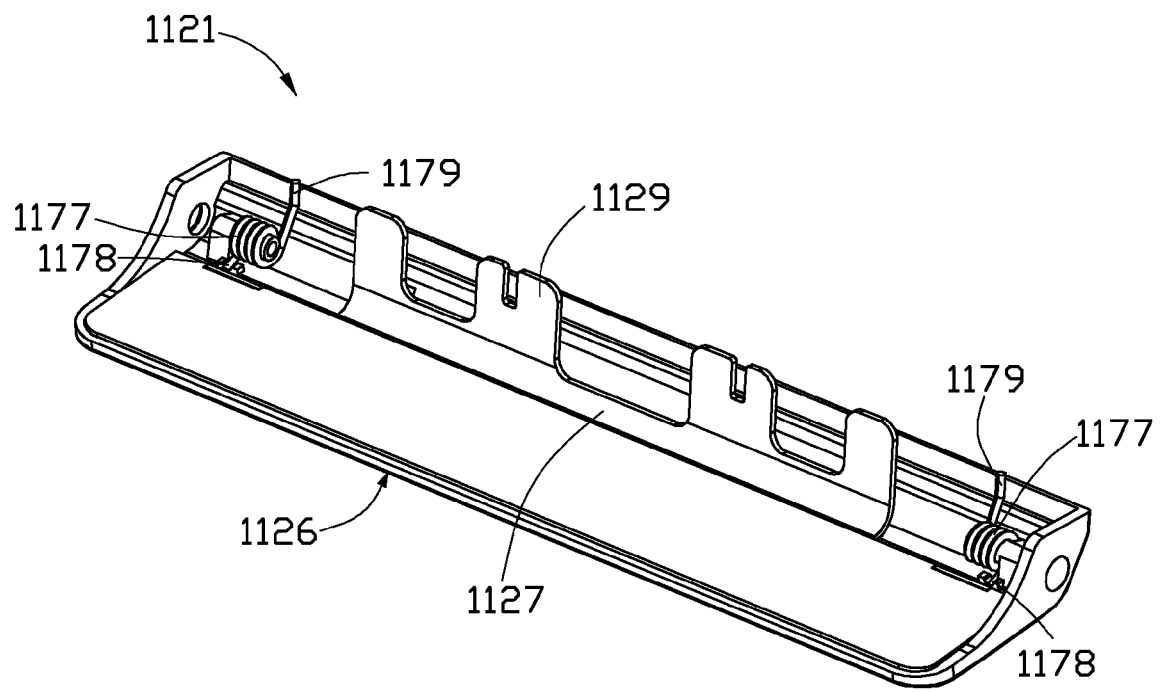
FIG. 4 is a schematic view of a rotatable clamper of the holding apparatus of FIG. 3.
Figure 5:
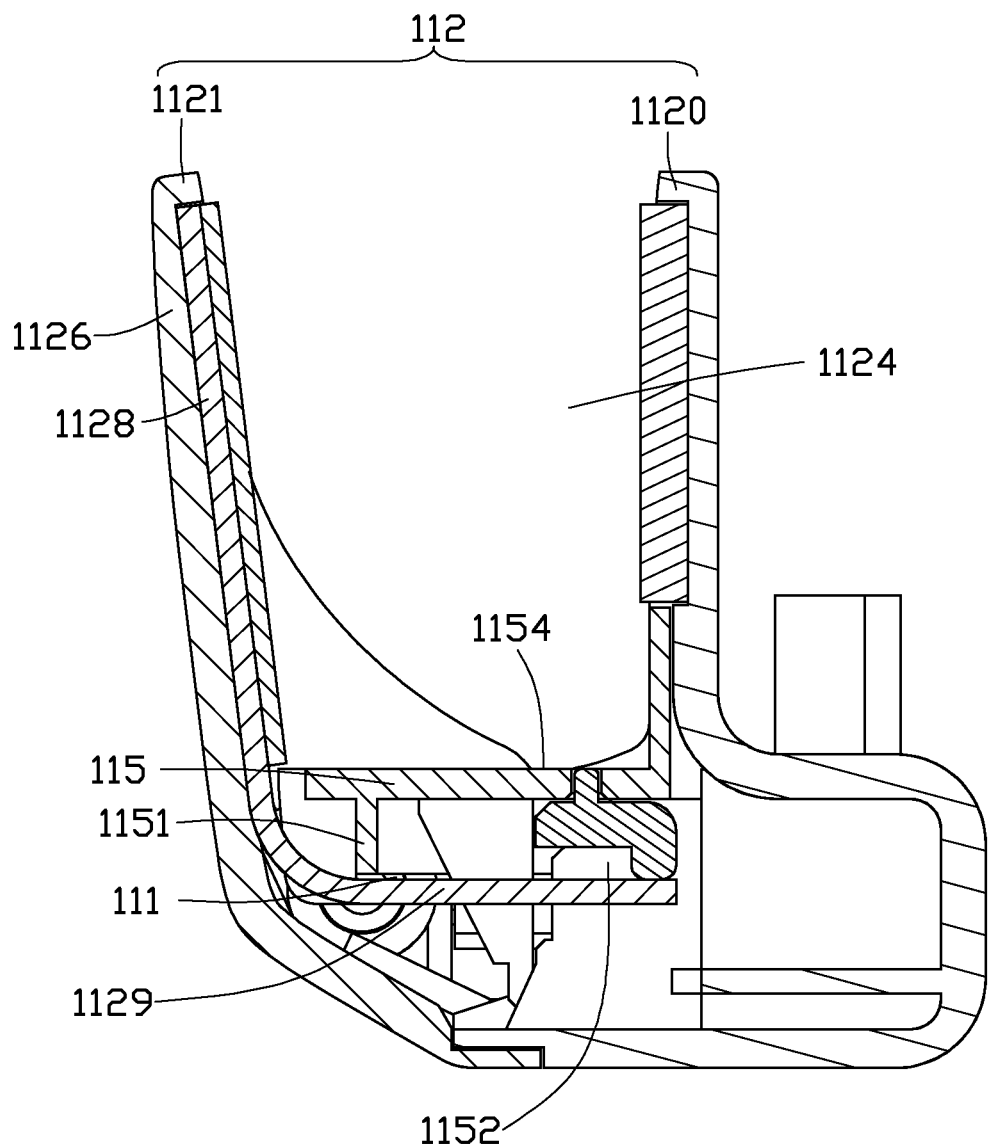
FIG. 5 is a cross-sectional view of the holding apparatus of FIG. 2, taken along line V-V.

The fixed clamper 1120 includes a first key slot 1125. Referring to FIGS. 4 and 5, the rotatable clamper 1121 includes a clamp body 1126 and a substantially L-shaped plate 1127 fixed to the clamp body 1126. The L-shaped plate 1127 includes a fixed arm 1128, which is formed on the clamp body 1126, and two resisting arms 1129, which extend from the fixed arm 1128 toward the fixed clamper 1120. In this embodiment, the two resisting arms 1129 are substantially perpendicular to the fixed arm 1128. In other embodiments, the two resisting arms 1129 are not perpendicular to the fixed arm 1128.

Figure 6:
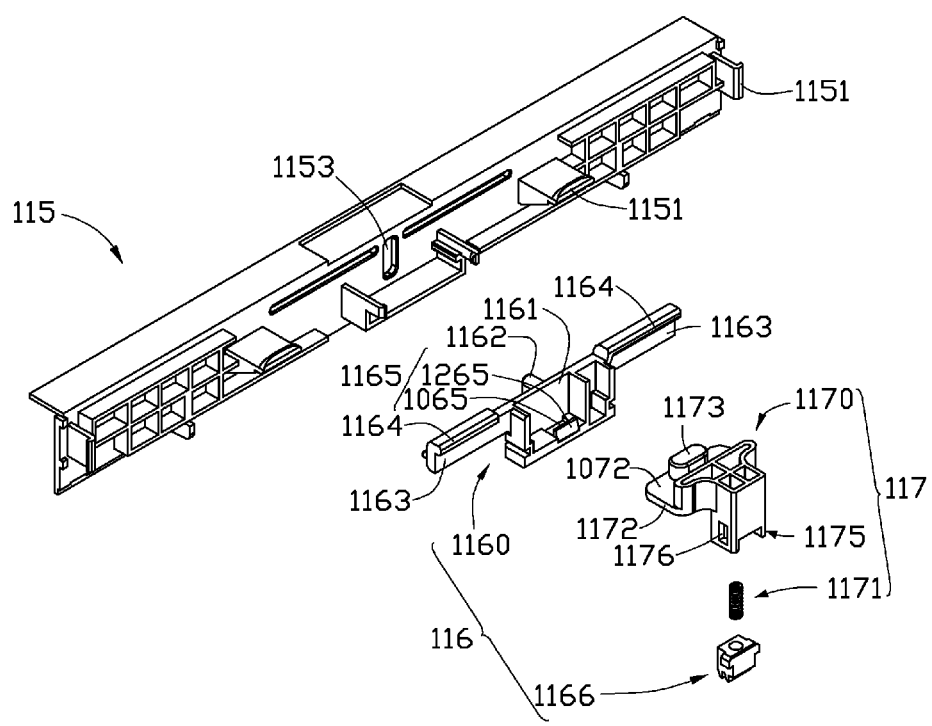
FIG. 6 is an exploded, isometric view of the holding apparatus of FIG. 2.

Referring to FIGS. 2, 5 and 6, the holding apparatus 11 further includes a supporting portion 115, which is received in the holding groove 1124. The supporting portion 115 includes a number of supporting plates 1151 protruding from a first bottom thereof, and the supporting plates 1151 resist the base 111. The supporting portion 115, the supporting plates 1151, and the base 111 cooperatively define a cavity 1152. The supporting portion 115 further defines a second key slot 1153. The cavity 1152 and the holding groove 1124 communicate with each other through the second key slot 1153.

Referring to FIGS. 1, 5, 6 and 7, the holding apparatus 1 further includes an adjustment portion 116. The adjustment portion 116 includes an angle adjusting member 1160. The angle adjusting member 1160 is substantially T-shaped and includes a base body 1161, a depressible member 1162 protruding from a second upper surface 1061 of the base body 1161, two side arms 1163 protruding from two opposite ends 1261 of the base body 1161, respectively, and two resisting portions 1164 protruding away from the depressible member 1162 from two first lower surfaces 1361 of the side arms 1163, respectively. The pressing button 1162 passes through the second key slot 1153 and is exposed out of a third upper surface 1154 of the supporting portion 115. The two resisting arms 1129 of the rotatable clamper 1121 are received in the cavity 1152. The base body 1161, the two side arms 1163, and the two resisting portions 1164 of the angle adjusting member 1160 are received in the cavity 1152 between the supporting portion 115 and the two resisting arms 1129. The two resisting portions 1164 resist the two resisting arms 1129, respectively.

The angle adjusting member 1160 further includes a hook 1165 protruding from a second bottom 1461 of the base body 1161. The adjustment portion 116 further includes a locking member 1166, which includes a main body 1167 and at least one locking protrusion 1168 protruding from the main body 1167. Each locking protrusion 1168 engages with the hook 1165 to prevent the rotatable clamper 1121 from rotating relative to the fixed clamper 1120 and from changing an angle between the fixed clamper 1120 and the rotatable clamper 1121. In this embodiment, the main body 1167 of the buckle 1166 includes a sidewall 1066. The buckle body 1168 includes a first buckle body 1068 and a second buckle body 1268, both of which protrude from the sidewall 1066 of the base 1167. The first locking protrusion 1068 is closer to the fixed clamper 1120 than the second locking protrusion 1268. The hook 1165, the first locking protrusion 1068, and the second locking protrusion 1268 are parallel to each other along a lengthwise direction, and a length of the locking protrusions 1268 and 1068 and the length of the hook 1165 are approximately equal. A fourth upper surface 1065 of the hook 1165 is facing the second bottom 1461 of the base body 1161 is substantially parallel with the second bottom 1461 of the base body 1161, and a fourth lower surface 1265 of the hook 1165 is inclined relative to the fourth upper surface 1065. A fifth lower surface 1468 of the locking protrusion 1168 facing away from the bottom 1461 of the base body 1161 is substantially parallel with the second bottom 1461 of the base body 1161, and a fifth upper surface 1368 of the locking protrusion 1168 is inclined relative to the fifth lower surface 1468.

Figure 7:
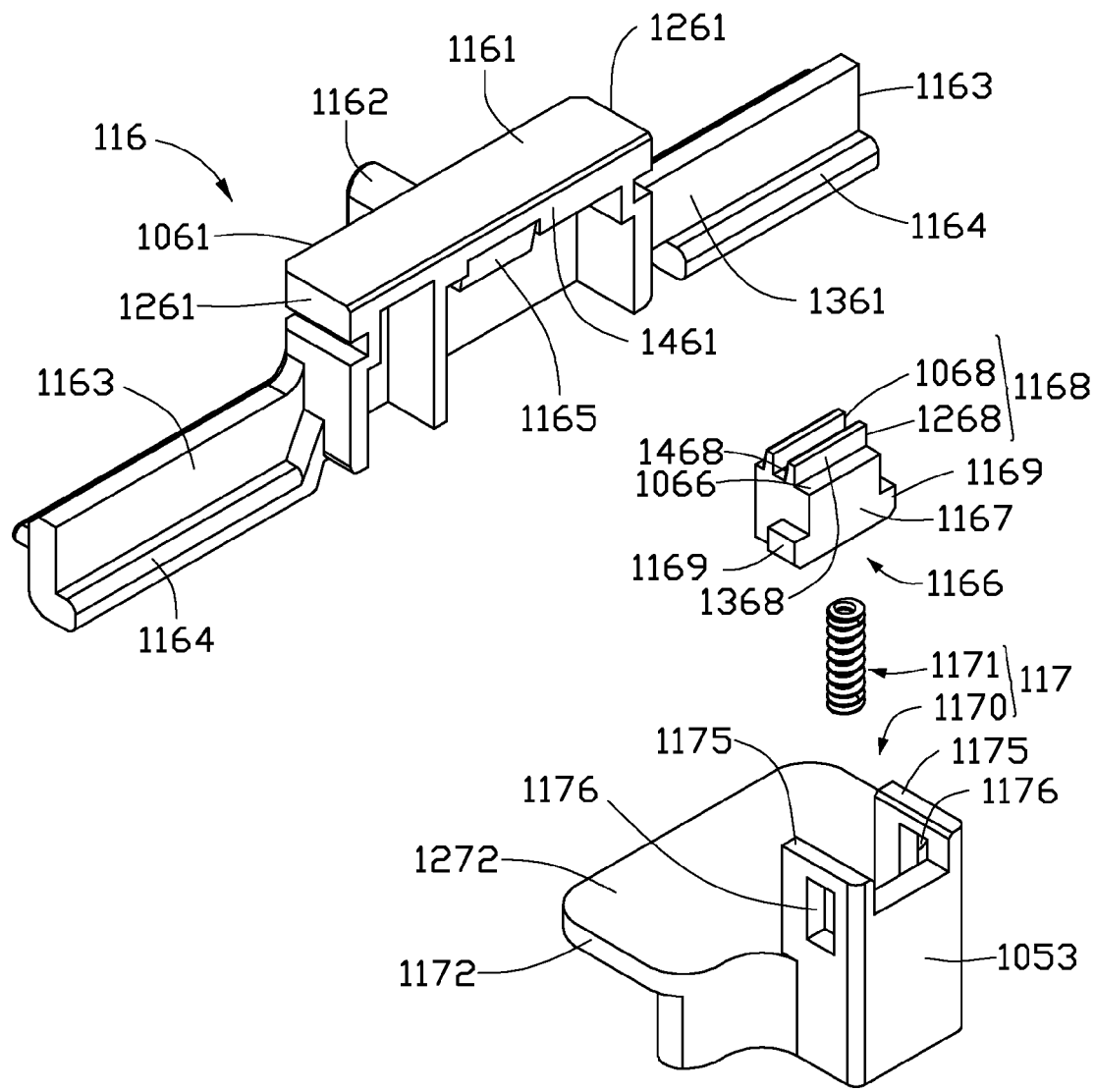
FIG. 7 is an exploded, isometric view of the holding apparatus of FIG. 6.
Figure 8:
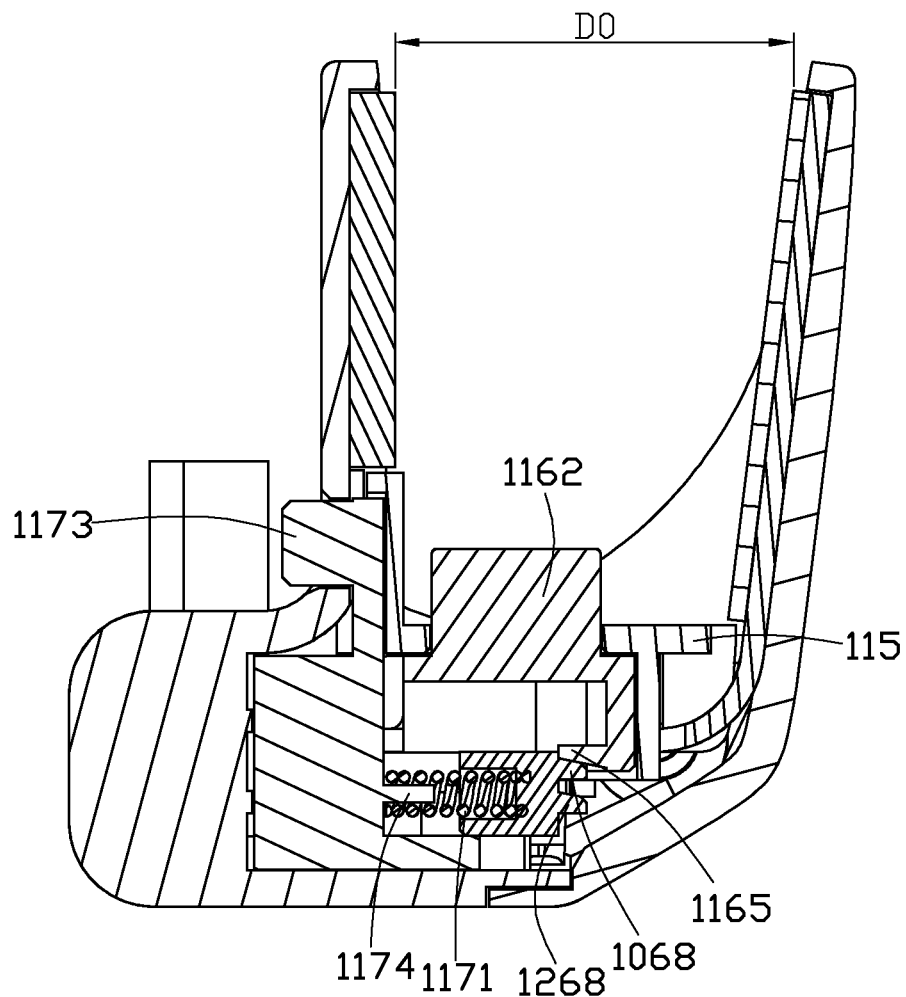
FIG. 8 is a cross-sectional view of the holding apparatus of FIG. 2, taken along line VIII-VIII in an initial state.

Referring to FIGS. 6, 7 and 8, the holding apparatus 1 further includes a reset portion 117. The reset portion 117 is located between the adjustment portion 116 and the fixed clamper 1120. The reset portion 117 includes a reset button 1170 and a spring 1171. The reset button 1170 includes a base plate 1172, a button body 1173, and a post 1174. The button body 1173 and the post 1174 protrude from opposite sides 1072, 1272 of the base 1172, respectively. The button body 1173 passes through the first key slot 1125 and is exposed out of the fixed clamper 1120. The button body 1173 is slidable along the key slot 1125 from one end to another end. The spring 1171 is fixed between the post 1174 and the main body 1167 of the buckle 1166.

The reset portion 117 further includes two fixed legs 1175, which protrude from the base plate 1172 and correspond to the post 1173. Each of the two fixed legs 1175 defines a through hole 1176. The buckle 1166 further includes two flanges 1169 protruding from the base plate 1167 for aligning with the through holes 1176. The two flanges 1169 are received in the two through holes 1176, respectively.

Figure 9:
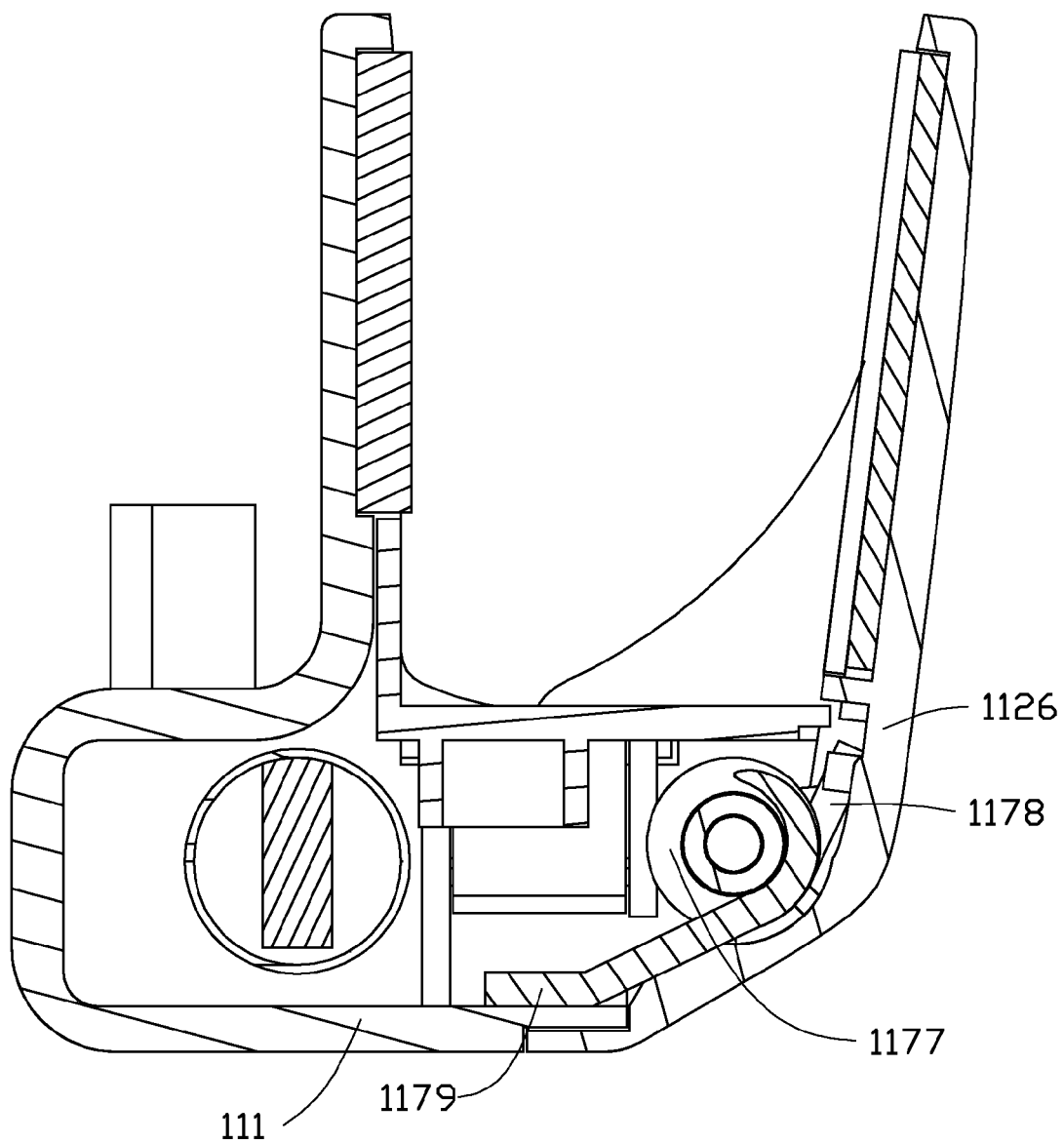
FIG. 9 is a cross-sectional view of the holding apparatus of FIG. 2, taken along line IX-IX in the initial state.

Referring to FIGS. 4 and 9, the reset button 117 further includes two torsion springs 1177. The two torsion springs 1177 are fixed to two opposite ends 1123 of the rotatable clamper 1121 respectively, and each of the two torsion springs 1177 includes a first arm 1178 and a second arm 1179. The first arm 1178 resists on the rotatable clamper 1121, and the second arm 1179 resists on the base 111.

Figure 10:
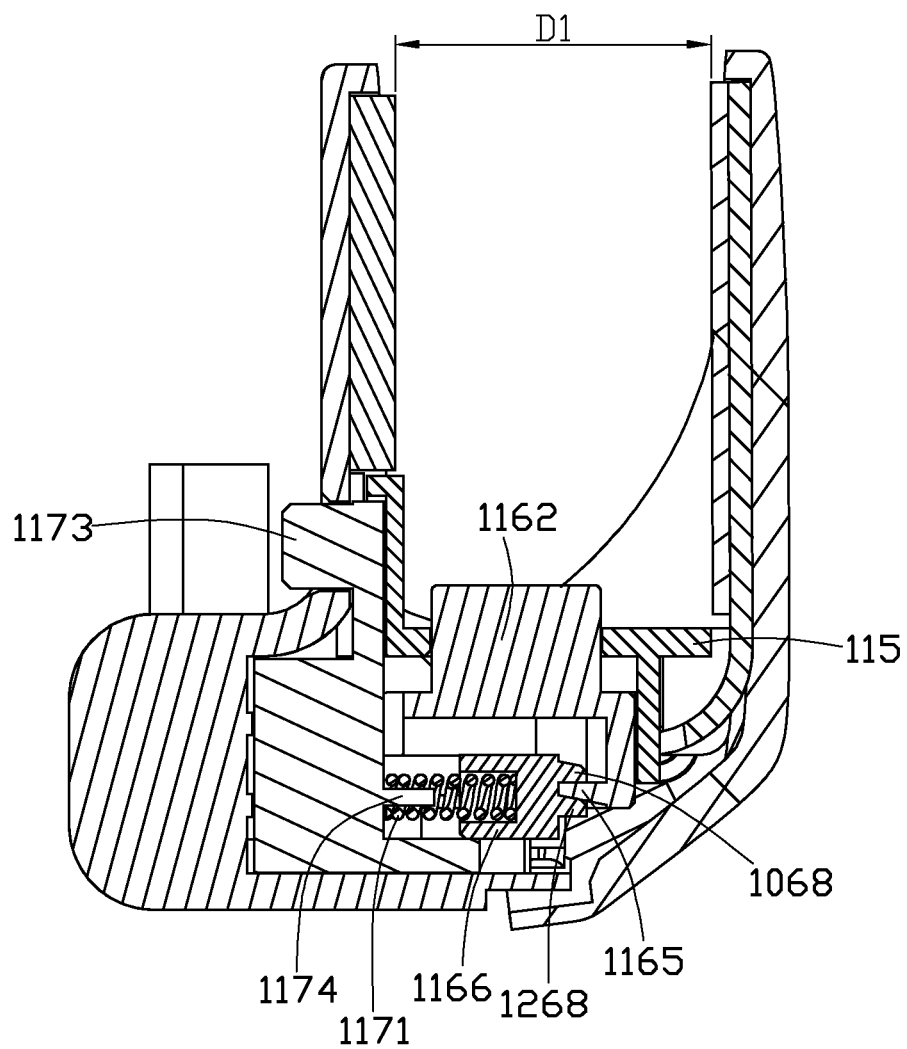
FIG. 10 is a cross-sectional view of the holding apparatus of FIG. 2, taken along line VIII-VIII in a first angled state.

Referring to FIGS. 8 and 10, when there is no electronic device 2 clamped in the holding groove 1124, a width between the fixed clamper 1120 and the rotatable clamper 1121 is D0, and the button body 1173 is arranged at a left end of the first key slot 1125. To clamp the electronic device 2 to the external keyboard 1, the electronic device 2 is first received in the holding groove 1124 until the electronic device 2 resists the depressible member 1162 of the angle adjusting member 161. Next, the electronic device 2 is pressed toward the depressible member 1162 to press the depressible member 1162. Since the rotatable clamper 1121 is jointed with the base 111 through the two pivots 1122, as the two resisting portions 1164 of the angle adjusting member 161 press the two resisting arms 1129 of the rotatable clamper 1121, the two resisting arms 1129 of the rotatable clamper 1121 are pressed down accordingly, and the rotatable clamper 1121 is rotated around the two pivots 1122 towards the fixed clamper 1120 until the hook 1165 of the angle adjusting member 1160 engages with the first locking protrusion 1068 of the locking member 1167. A resulting width D1 between the fixed clamper 1120 and the rotatable clamper 1121 is less than the width D0. If the electronic device 2 has a thickness equal to the width D1, then the electronic device 2 fits snuggly in the holding groove 1124, the button body 1173 is still located at the left end of the first key slot 1125, and the two torsion springs 1177 are compressed.

Figure 11:
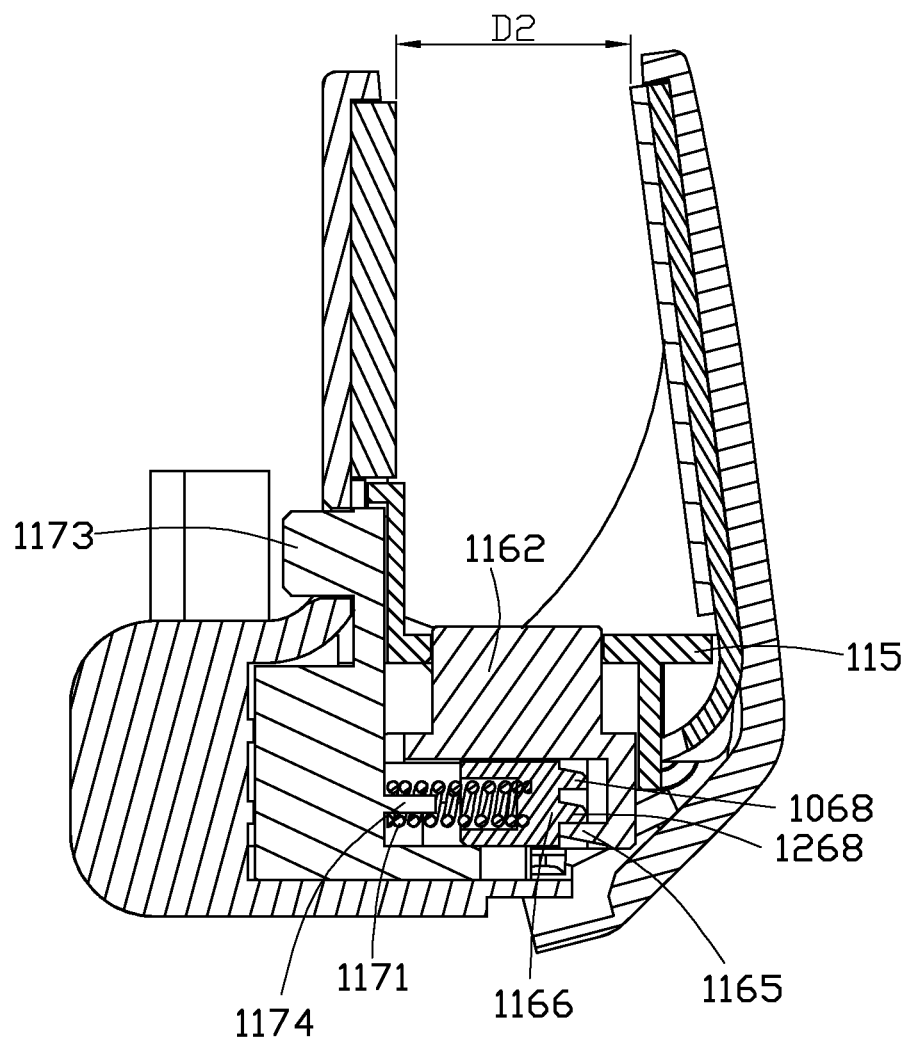
FIG. 11 is a cross-sectional view of the holding apparatus of FIG. 2, taken along line VIII-VIII in a second angled state.

Referring to FIG. 11, if the electronic device 2 has a thickness D2 less than the thickness D1, the depressible member 1162 is continuously pressed by the electronic device 2, the hook 1165 of the angle adjusting member 1160 engages with the second locking protrusion 1268 of the buckle 1167, and the electronic device 2 is held snuggly in the holding groove 1124. The button body 1173 is still located at the left end of the first key slot 1125, and the two torsion springs 1177 are compressed further.

Figure 12:
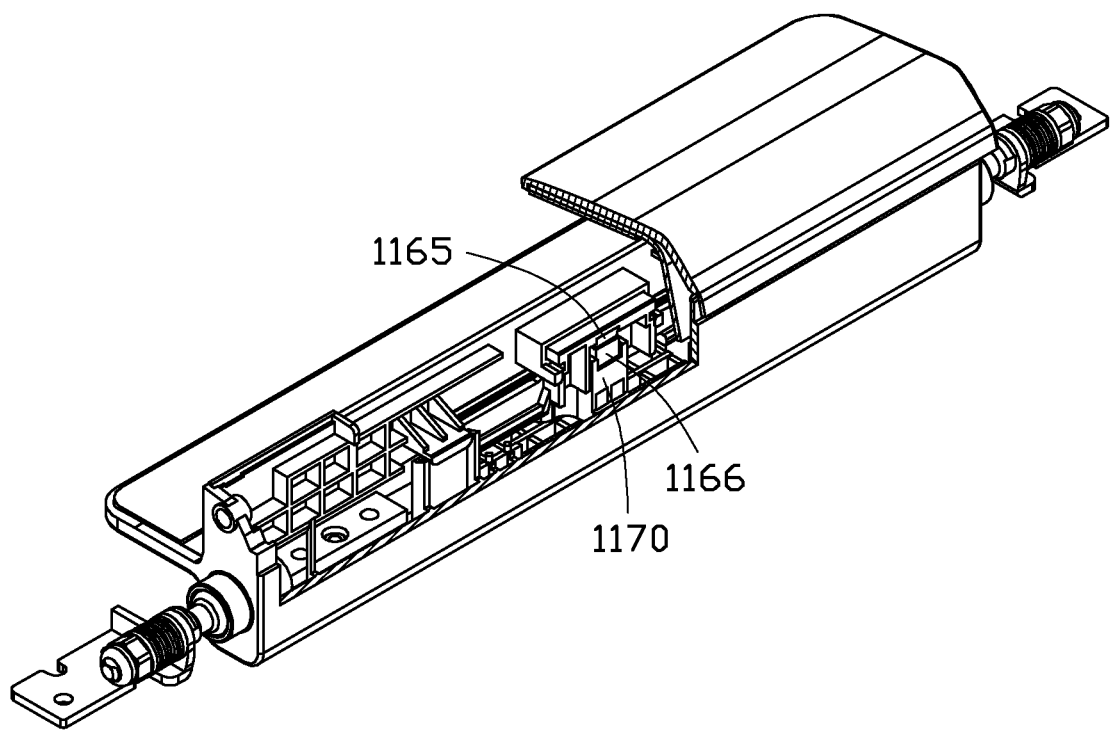
FIG. 12 is a partial view of FIG. 2.
Figure 13:
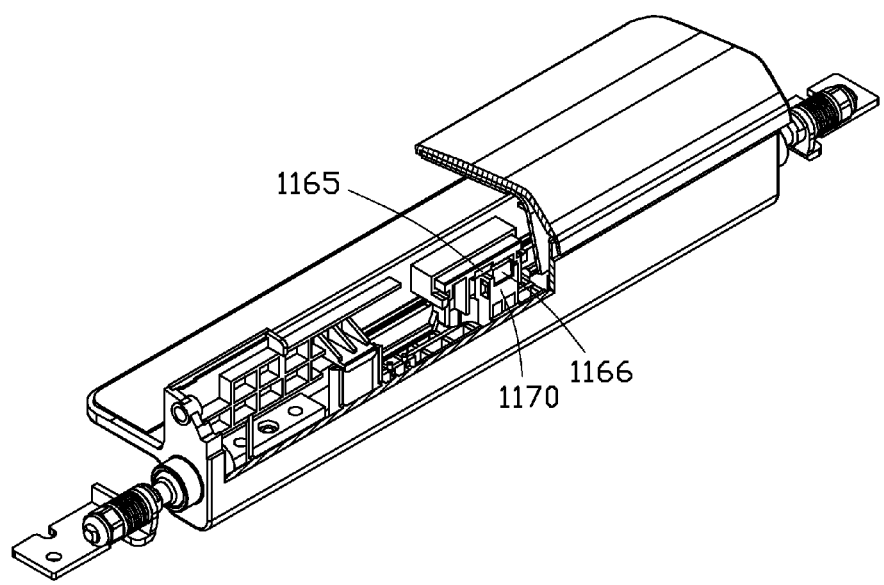
FIG. 13 is another partial view of FIG. 2.

Referring to FIGS. 12 and 13, to release the electronic device 2 from the holding groove 1124 of the holding apparatus 1, the button body 1173 of the reset portion 117 is slid from the left end of the key slot 1125 to the right end, and the locking protrusion 1168 of the locking member 1166 disengages from the hook 1165 of the adjustment portion 116. Since the button body 1173 of the reset portion 117 is fixed to one end of the spring 1171 while the other end of the spring 1171 is fixed to the locking member 1166, and since the locking protrusion 1168 of the locking member 1166 engages with the hook 1165 of the adjustment portion 116, when the button body 1173 is slid to the right end of the key slot 1125, the locking protrusion 1168 of the locking member 1166 is disengaged from the hook 1165 of the adjustment portion 116, and the two torsion springs 1177 elastically restore to rotate the rotatable clamper 1121 around the two pivots 1122 away from the fixed clamper 1120 until the two torsion springs 1177 return to their original state and the width between the fixed clamper 1120 and the rotatable clamper 1121 is D0. Thus, the electronic device 2 is easily removed from the holding groove 1124 of the holding apparatus 1.

It is to be understood, however, that even though numerous characteristics and advantages of the present disclosure have been set forth in the foregoing description, together with details of the structure and function of the present disclosure, the present disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A holding apparatus comprises:
   a base;
   a clamp portion protruding from the base and configured for holding an electronic device, the clamp portion comprising a fixed damper and a rotatable clamper hinged to the base, wherein the rotatable clamper includes a fixed arm and two resisting arms which extends from the fixed arm toward the fixed clamper,
   an adjustment portion comprising
      an angle adjusting member which comprises a base body, a depressible member protruding from a first upper surface of the base body, two side arms protruding from two opposite ends of the base body and two resisting portions protruding from a first lower surface of the side arms toward a direction away from the depressible member, the two resisting portions respectively resisting on the two resisting arms; the angle adjusting member further includes a hook extending from a second bottom of the base body; and a locking member which includes a main body and at least one locking protrusion protruding from the main body; each of the locking protrusion is engagable with the hook to prevent the rotatable clamper from rotating with the fixed clamper.

2. The holding apparatus according to claim 1, wherein the fixed clamper, the base and the rotatable clamper are configured to cooperatively define a holding groove for holding the electronic device; the holding apparatus further comprises:

a supporting portion, which is received in the holding groove, the supporting portion defining a second key slot, the supporting portion and the base are configured to cooperatively define a cavity, the cavity and the holding groove communicating with each other through the second key slot.

3. The holding apparatus according to claim 2, wherein the supporting portion includes a number of supporting plates protruding from a first bottom thereof, the supporting portion, the supporting plates and the base cooperatively define the cavity.

4. The holding apparatus according to claim 3, wherein the depressible member passes through the second key slot and is exposed in the holding groove, the resisting arm of the rotatable clamper is received in the cavity; the base body, the two side arms, and the two resisting portions of the angle adjusting member are received in the cavity and arranged between the supporting portion and the two resisting arms.

5. The holding apparatus according to claim 1, wherein a fourth upper surface of the hook facing the bottom of the base body is substantially parallel with the bottom of the base body, a fourth lower surface of the hook is inclined relative to the fourth upper surface; and a fifth lower surface of the locking protrusion facing away from the bottom of the base body is substantially parallel with the bottom of the base body and a fifth upper surface of the locking protrusion is inclined relative to the fifth lower surface.

6. The holding apparatus according to claim 1, wherein the holding apparatus further includes a reset portion which is located between the adjustment portion and the fixed clamper, the fixed damper comprises a first key slot, the reset portion includes a reset button and a spring, the reset button includes a base plate, a button body and a post, the button body and the post protruding from opposite sides of the base plate respectively; the button body passes through the first key slot and is exposed out of the fixed clamper and is slidable along the key slot from one end to another end; the spring is fixed between the post and the main body of the locking member.

7. The holding apparatus according to claim 6, wherein the reset portion further comprises two fixed legs protruding from the base plate corresponding to the post; each of the two fixed legs defines a through hole; the locking member further includes two flanges protruding from the main body for aligning with the corresponding through holes; the two flanges are received in the two through holes respectively.

8. The holding apparatus according to claim 7, wherein the reset button further includes two torsion springs, the two torsion springs are fixed to the two opposite ends of the rotatable clamper respectively, and each of the two torsion springs includes a first arm and a second arm; the first arm resists on the rotatable clamper and the second arm resists on the base.

9. The holding apparatus according to claim 1, wherein the holding apparatus further includes two rotatable shafts and two fixed portions, the two rotatable shafts are rotatablely connected to opposite ends of the base respectively, the two fixed portions are fixed to the two rotatable shafts at ends of the two rotatable shafts distal from the base respectively, the keyboard body is fixed to ends of the two fixed portions distal from the rotatable shafts.

10. An external keyboard assembly comprising
a keyboard body and
a holding apparatus fixed to the keyboard body, wherein the holding apparatus comprises:
a base;
two rotatable shafts, rotatablely connected to two ends of the base;
two fixed portions, fixed to the two rotatable shafts at ends of the two rotatable shafts away from the base respectively, the keyboard body is fixed to ends of the two fixed portions away from the rotatable shafts;
a clamp portion protruding from the base and configured for holding the electronic device, the clamp portion comprising a fixed damper and a rotatable clamper hinged to the base, wherein the rotatable clamper includes a fixed arm and two resisting arms which extends from the fixed arm toward the fixed clamper,
an adjustment portion comprising:
an angle adjusting member comprises a base body, a depressible member protruding from a first upper surface of the base body, two side arms protruding from two opposite ends of the base body and two resisting portions protruding from a first lower surface of the side arms toward a direction away from the depressible member, the two resisting portions respectively resisting on the two resisting arms; the angle adjusting member further includes a hook extending from a second bottom of the base body;
a locking member which includes a main body and at least one locking protrusion protruding from the main body; each of the locking protrusion is engagable with the hook to prevent the rotatable clamper from rotating with the fixed clamper.

11. The external keyboard according to claim 10, the fixed clamper, the base and the rotatable clamper are configured to cooperatively define a holding groove for holding an electronic device; the holding apparatus further comprises:

a supporting portion, which is received in the holding groove, the supporting portion defining a second key slot, the supporting portion and the base cooperatively define a cavity, the cavity and the holding groove communicating with each other through the second key slot.

12. The external keyboard according to claim 11, wherein the supporting portion includes a number of supporting plates protruding from a first bottom thereof, the supporting portion, the supporting plates and the base cooperatively define the cavity.

13. The external keyboard according to claim 12, wherein the depressible member passes through the second key slot and is exposed in the holding groove, the resisting arm of the rotatable clamper is received in the cavity; the base body, the two side arms, and the two resisting portions of the angle adjusting member are received in the cavity and arranged between the supporting portion and the two resisting arms.

14. The external keyboard according to claim 10, wherein a fourth upper surface of the hook facing the second bottom of the base body is substantially parallel with the bottom of the base body, a fourth lower surface of the hook is inclined relative to the fourth upper surface; and a fifth lower surface of the locking protrusion facing away from the bottom of the base body is substantially parallel with the second bottom of the base body and a fifth upper surface of the locking protrusion is inclined relative to the fifth lower surface.

15. The external keyboard according to claim 10, wherein the holding apparatus further includes a reset portion which is located between the adjustment portion and the fixed clamper, the fixed damper comprises a first key slot, the reset portion includes a reset button and a spring, the reset button includes a base plate, a button body and a post, the button body and the post protruding from opposite sides of the base plate respectively; the button body passes through the first key slot and is exposed out of the fixed clamper and is slidable along the key slot from one end to another end; the spring is fixed between the post and the main body of the locking member.

16. The external keyboard according to claim 15, wherein the reset portion further comprises two fixed legs which are protruding from the base plate corresponding to the post; each of the two fixed legs defines a through hole; the locking member further includes two flanges protruding from the main body for aligning with the corresponding through holes; the two flanges are received in the two through holes respectively.

17. The external keyboard according to claim 16, wherein the reset button further includes two torsion springs, the two torsion springs are fixed to the two opposite ends of the rotatable clamper respectively, and each of the two torsion springs includes a first arm and a second arm; the first arm resists on the rotatable clamper and the second arm resists on the base.

* * * * *